March 31, 1942.  G. C. BELTMAN  2,278,160
BRAKING MECHANISM
Filed April 7, 1941  3 Sheets-Sheet 2

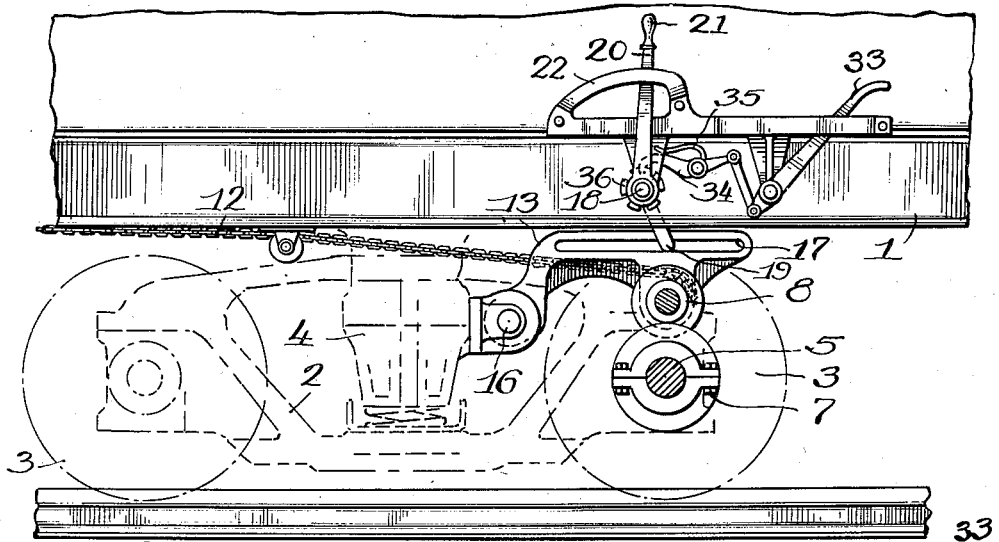
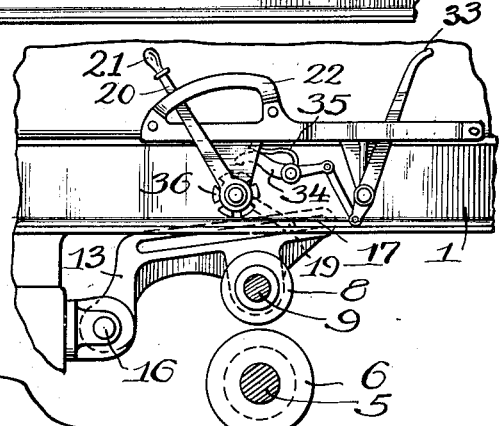
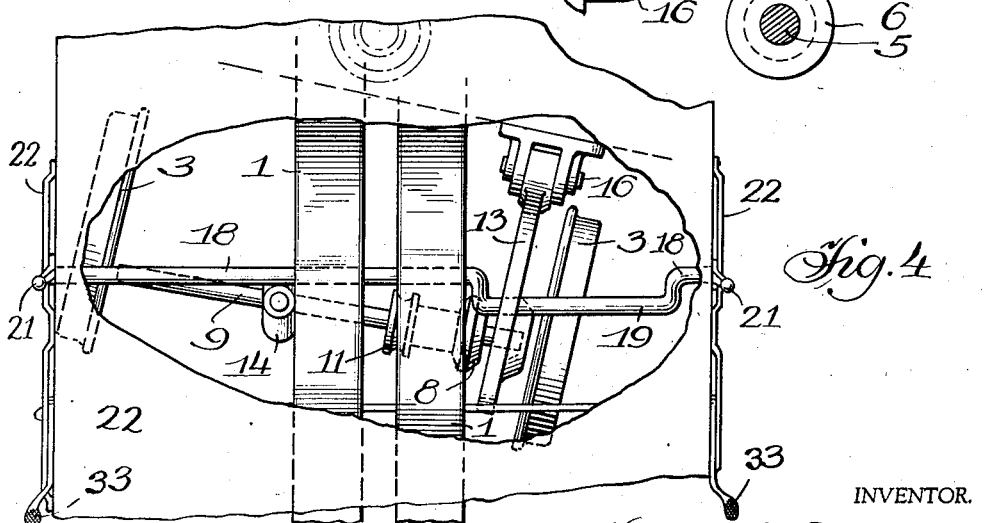

INVENTOR.
BY George C. Beltman

March 31, 1942.  G. C. BELTMAN  2,278,160
BRAKING MECHANISM
Filed April 7, 1941  3 Sheets-Sheet 3

INVENTOR.
George C. Beltman,
BY Parkinson Lane Attys.

Witness:
Chas. R. Koursh.

Patented Mar. 31, 1942

2,278,160

UNITED STATES PATENT OFFICE 2,278,160

BRAKING MECHANISM

George C. Beltman, Chicago, Ill.

Application April 7, 1941, Serial No. 387,189

6 Claims. (Cl. 188—145)

The present invention relates to a safety power take-off to be used in connection with brakes on freight cars and the like when the freight cars are detached from the train and are moved as in freight yards.

One of the objects is to provide a power take-off which may be actuated by the trainman throwing a lever from either side of the car, which puts in operation the mechanism utilizing the momentum of the car to positively apply the brake shoes to the wheels.

Another object is to provide a mechanism which will prevent injury, inasmuch as it will not be necessary for the trainman to mount the car he can initiate the braking action without riding the car to its ultimate stopping point, thus damage to the freight car and its contents which is abnormally high in the present structures now in use throughout the country is largely eliminated.

Another object is to provide positive friction driven mechanism to positively exert the pull on the brake shoes at any position of the car whether on a straight line or when the car is turning a curve.

A still further object is to provide means for instant release of the power take-off and the resultant release of the spring actuated brake shoes.

A still further object is to provide an automatic locking device to hold the power take-off in non-operative position, except when it is desired to place it into operation by a turn of the handles on either side of the car.

Another object is to mount the actuating means for the power take-off primarily on the truck bolster but with means mounted on the underframe of the car so that the pull on the brake actuating chain is directed to the underframe of the car. Thus, the power actuating means being mounted on the truck will enable the frictional drive wheels to be moved into engagement at all times when the car is turning a curve as well as driving on a straight line, but the strain from the pull of the brake chain is for the most part taken up by the framework of the car itself instead of the truck.

Further objects are to provide a construction of maximum simplicity, efficiency, economy, safety, ease of assembly and operation, and such further objects, advantages and capabilities as will later more fully appear and are inherently possessed thereby.

The invention further resides in the combination, construction and arrangement of parts illustrated in the accompanying drawings, and while I have shown therein a preferred embodiment, it is understood that the same is susceptible to modification and change without departing from the spirit of my invention.

In the drawings:

Figure 1 is a side elevation of the brake assembly showing one form of my power device and with the near car wheels removed, the remainder of the truck assembly being shown in dotted outline.

Figure 4 is a top plan view similar to Figure 2 but showing the position the operative parts will take when the car is rounding a curve.

Figure 5 is a fragmentary view in side elevation of a portion of Figure 1 showing the brake control in a released position.

Figure 2:
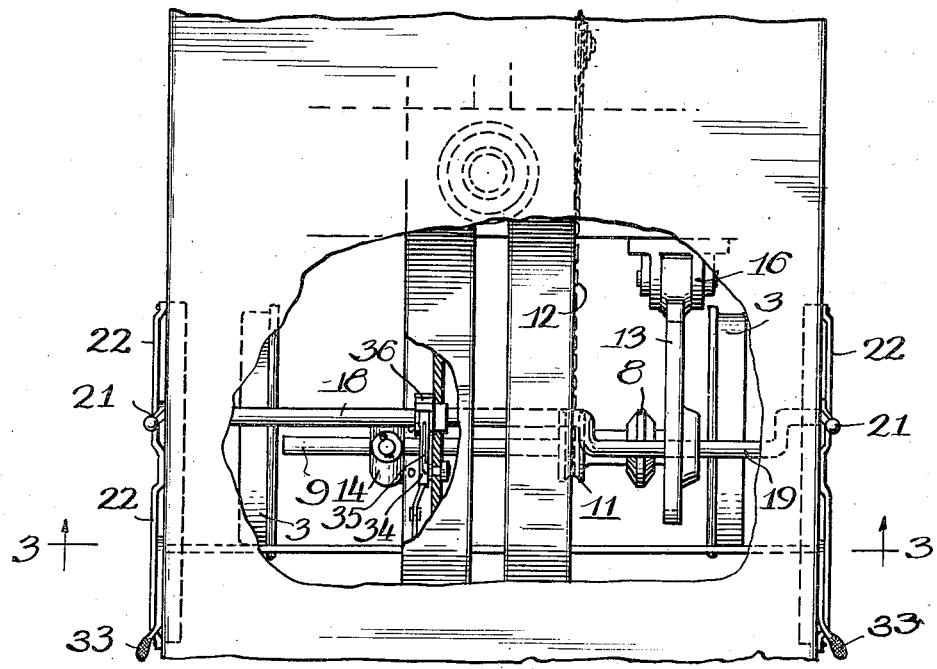
Figure 2 is a top plan view with a part of the front car body removed.

Referring more particularly to the drawings, 1 represents the under framework of a freight car. The truck frame 2 is mounted underneath the underframe 1 and is provided with the usual wheels 3 and bolster 4. The bolster 4 has the usual attachment to the framework 1 allowing rotation and vertical movement of the bolster 4 and truck frame 2 with respect to the body of the freight car.

Figure 3:
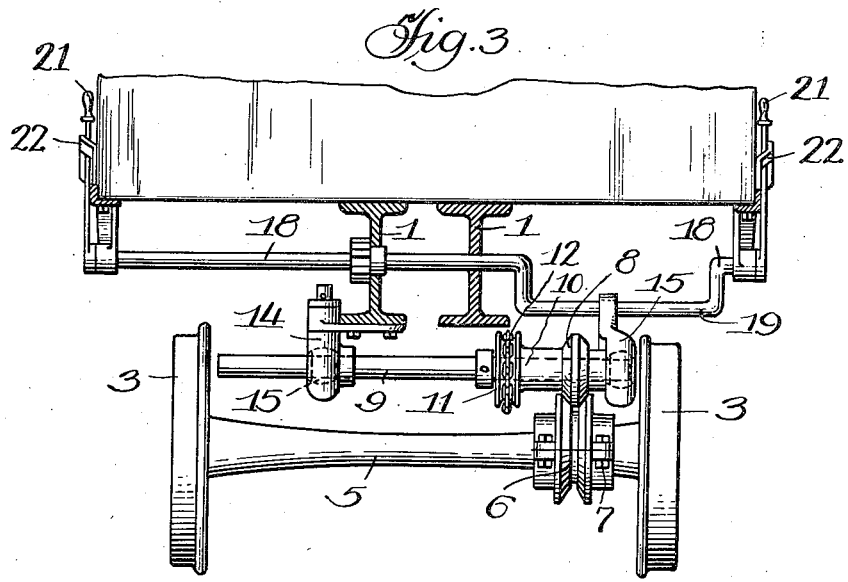
Figure 3 is a sectional view on line 3—3 of Figure 2.

The wheels 3 of the truck are carried by an axle 5 as shown in Figure 3. In the preferred embodiment of my invention, a two-part female grooved wheel 6 is mounted on axle 5. This wheel 6 may be attached in any suitable manner, but when my invention is to be added to equipment already constructed the two parts of wheel 6 may be fixedly placed around the axle 5 and secured as by bolt 7.

In Figure 3 the device is shown in operative position and contacting the female grooved wheel 6 is a complementary male grooved wheel 8 which is rotatably mounted on a shaft 9. When the wheels 6 and 8 are in contacting position as shown in Figure 3, the rotation of wheel 6 will cause wheel 8 to rotate. Wheel 8 is provided with a sleeve 10 upon which is fixedly mounted a circumferentially grooved spool or wheel 11. The assembly of the wheel 8, the sleeve 10, and the wheel 11 rotates as a unit. Attached to and around wheel 11 is a chain 12, which chain is attached at its other end to the usual braking connections of the car.

It will thus be seen that when the take-off device is set for operation the rotation of the wheels 3 of the freight car causes rotation of the V-grooved wheels, which in turn wraps one end of the chain 12 around the wheel 11 which tightens the chain and exerts a pull of several tons upon the usual car brakes.

I have also provided mechanism for placing my device in inoperative position. When in inoperative position as shown in Figure 5, the wheel 8 is lifted from contact with wheel 6. It is necessary in connecting actuating mechanism to secure sufficient pull on the brake chain to provide for positive contact regardless of the varying movements of the truck assembly with respect to the movement of the framework of the car. For instance, when the freight car is rounding a curve the truck assembly will assume an arc greater than the arc of the entire car. By mounting the coacting wheel 8 on shaft 9 which is journaled on a pivoted arm 13 and attaching said arm 13 to the bolster 4 of a floating truck, it will be seen that the grooved wheel 8 will follow the line of the truck and therefore at all times ride even and in close proximity to the completary grooved wheel 6. It is important, in turning a curve for instance and where the arc of the truck is greater than the arc of the freight car, to make this provision for ready engagement of wheels 6 and 8. It is necessary, however, that the pull exerted by the brake chain 12 be exerted for the most part not on the truck but on the underframe of the car. Otherwise the pull of several tons would exert too much pressure against the truck frame which would have a tendency to derail the truck, especially on curves. I deem it preferable to attach chain 12 to the underside of the chain wheel 11 so that a pull on the chain operates to force wheels 6 and 8 into closer frictional engagement when the freight car is running in a forward direction. Accordingly, I mount one end of shaft 9 in a self-aligning journal 14 which is connected to the underframe of the car. To allow for movement of the truck with respect to the car frame, a self-aligning universal ball bearing is carried in journal 14 to carry one portion of the shaft 9.

I will now describe the mechanism by which the shaft 9 carrying the coacting grooved wheel 8 is moved in or out of operative position. In Figures 1, 2, 3, 4 and 5, shaft 9 is shown as carried at its end opposite the journal 14 by a self-aligning journal 15, which journal is pivotally connected at 16 to the bolster 4. This journal is provided with an arm 13 which is pivotally attached to the bolster 4. Arm 13 in the structure shown in Figures 1 to 5 has an upwardly extending slotted aperture 17. Coacting with the slotted aperture 17 is an arm 18 extending the width of the car and having an offset portion 19. This offset portion 19 has sliding engagement with the aperture 17. At each end of the arm 18 is a lever 20 provided with a handle 21. Suitable guides 22 to direct and limit the movement of the lever 20 are also mounted adjacent each lever 20.

It will be seen that as lever 20 is pushed in either forward or backward position the arm 18 is partially rotated which acts to rock the offset portion 19, which acts within the aperture 17 to serve to raise or lower the journal 15 and thus raise or lower one end of shaft 9 and consequently raise or lower grooved wheel 8 into or out of engagement with the complementary grooved wheel 6.

Figure 6:
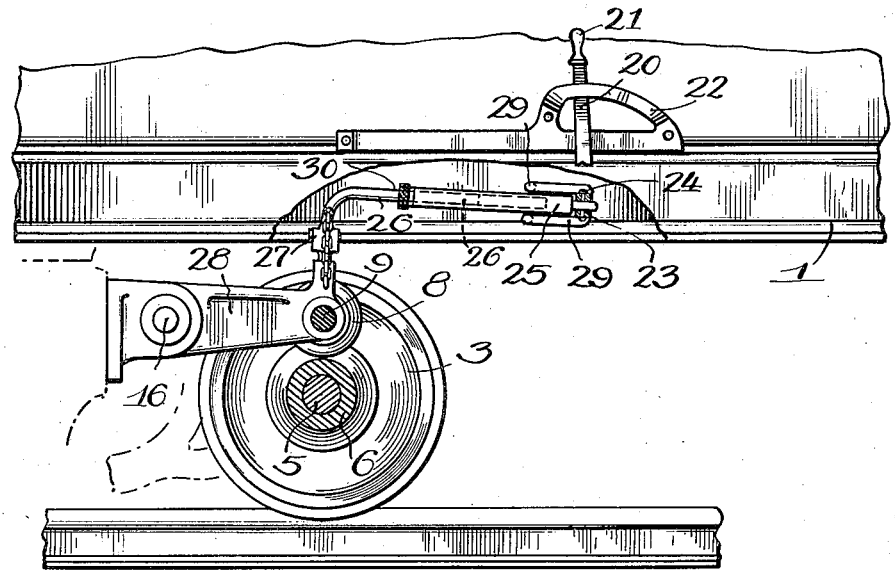
Figure 6 is a side elevation similar to Figure 1 but showing an alternate and simplified form of actuating mechanism.
Figure 7:
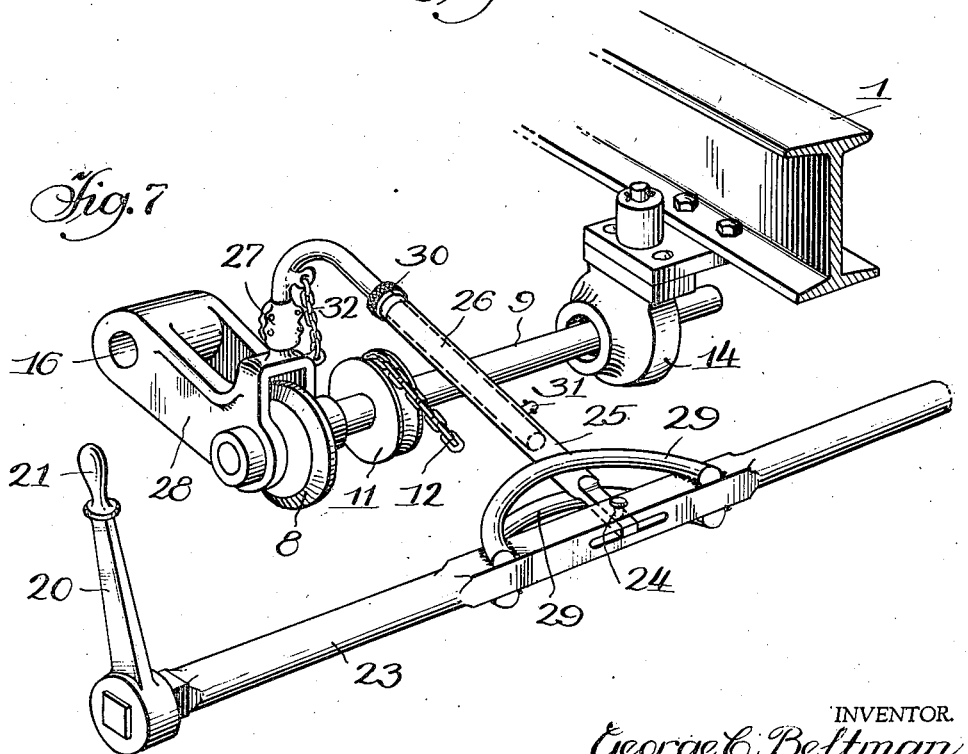
Figure 7 is a perspective view of the simplified form of the actuating mechanism shown in Figure 6.

I have devised a modified form of control mechanism for freight cars, particularly dump cars where space is at a premium and which require a minimum of moving parts underneath the car. The modified structure is shown in Figures 6 and 7. While utilizing the same form of lever 20 I prefer to use a rod 23. Pivotally mounted to the arm 23 at 24 is an elongated sleeve 25. Telescoping within sleeve 25 is an arm 26 which is connected to a universal joint 27. Attached to joint 27 is a bifurcated carrier arm 28 which carries one end of shaft 9 upon which the grooved wheels 8 and 11 are mounted.

The sleeve 25 is actuated by rocker arms 29 which are mounted on the rod 23. It will be seen that as lever 20 is moved the rod 23 is partially rotated, causing the rocker arms 29 to raise or lower sleeve 25, which in turn raises or lowers arm 26 and carrier arm 28. As the truck turns with respect to the underframe of the car, a varying space between the carrier arm 26 and the rod 23 results, and the telescoping action between arm 26 and sleeve 25 allows for the resulting variation of space. I have made provision for a suitable washer or packing at one end of sleeve 25 as shown at 30. I have also provided for lubrication within the sleeve by an Alemite cup 31 or the like. Additional safety features to prevent any accidental fall of the carrier arm 28 may be added such as the auxiliary safety chain 32 as shown in Figure 7.

It will be apparent that provision should be made against accidental or unauthorized movement of the actuating lever 20 such as locking devices as shown in Figures 1 and 5. I have provided an auxiliary lever 33 which is pivoted on the guide 22 and having bell crank connections to a pawl 34. Pawl 34 has a spring 35 which normally tends to hold pawl 34 in locked position with sprocket 36 which is fixedly mounted on lever 20. As lever 33 is partially rotated, pawl 34 is raised or lowered out of or into locking engagement with sprocket 36. When in locked position as shown in Figure 1, it is impossible to move lever 20 and place the power takeoff in operating position. Suitable provision may be made by padlock or other means to prevent the movement of lever 23 by unauthorized persons.

Having thus described my invention, what I claim as new and desire to secure by Letters Patent is:

1. In a braking device for freight cars having the usual brake shoes and assembly including a brake chain, a power take-off adapted to exert a pull upon the brake chain, a spool around which one end of the chain is wrapped, a shaft rotatably mounted adjacent one end to the chassis of the freight car and adjustably and rotatably mounted adjacent its other end to the truck, complementary members one of which is fixedly mounted on said shaft and the other fixedly mounted on an axle of the freight car and having frictional engagement for causing braking of the car, and means to lift said first mentioned member out of frictional engagement with said second member for releasing the braking action.

2. In a brake mechanism for freight cars having the usual brake assembly, a power take-off comprising a fixedly mounted wheel on the axle of the car wheels, a complementary wheel adapted to have circumferential frictional engagement with said fixedly mounted wheel, an element for wrapping engagement with the brake chain, said element being actuated by said complementary wheel, a shaft carrying said element and said complementary wheel, universal mountings near each end of said shaft, a journal housing said mountings near each end of said shaft, one journal being pivotally attached to the truck and the other journal being attached to the chassis of the car frame, and releasing means to lift said complementary wheel out of frictional engagement with the fixedly mounted axle wheel.

3. In a brake mechanism for freight cars having the usual brake assembly, brake shoes, brake chains and floating trucks, a power take-off comprising a fixedly mounted wheel on the axle of the car wheels, a complementary wheel adapted to have circumferential frictional engagement with said fixedly mounted wheel, a rotating spool for wrapping engagement with the brake chain, said spool being actuated by said complementary wheel, a shaft carrying said spool and said complementary wheel, universal mountings near each end of said shaft, a journal housing said mountings near each end of said shaft, one journal being pivotally attached to the floating truck and the other journal being attached to the chassis of the car frame, releasing means to lift said complementary wheel out of frictional engagement with the fixedly mounted axle wheel, said releasing means having arms to telescope within each other, a rod adapted to be rocked, and arms mounted on said rod to move the telescoping arms when said rod is rocked.

4. In a freight car having the usual rotatably mounted trucks, brake chain and braking mechanism, a fixedly mounted wheel mounted on the axle of one of said trucks, a complementary rotating wheel adapted to have frictional engagement with said axle wheel, means actuated by said complementary wheel to exert a pull upon the brake chain comprising a shaft to carry said complementary wheel, a spool around which one end of the brake chain is wound, a shaft supported near its ends by universal mountings, journals enclosing said mountings, one of said journals being pivotally attached to the bolster of the truck and the other journal being fixedly attached to the framework of the car, means to move said complementary wheel into or out of frictional engagement with said axle wheel comprising a rocker rod, a sleeve pivotally mounted on said rocker rod, a pair of arms mounted on said rocker rod to raise or lower said sleeve when said rocker arm is rocked, and a rod, one end of which is telescoped within said sleeve and having engagement at its other end with said pivotally mounted journal.

5. In a freight car having the usual rotatably mounted trucks, brake chain and braking mechanism, a fixedly mounted wheel mounted on the axle of one of said trucks, a complementary rotating wheel adapted to have frictional engagement with said axle wheel, means actuated by said complementary wheel to exert a pull upon the brake chain comprising a shaft to carry said complementary wheel, a spool around which one end of the brake chain is wound, a shaft supported near its ends by universal mountings, journals enclosing said mountings, one of said journals being pivotally attached to the bolster of the truck and the other journal being fixedly attached to the framework of the car, means to move said complementary wheel into or out of frictional engagement with said axle wheel comprising a rocker rod, a sleeve pivotally mounted on said rocker rod, a pair of arms mounted on said rocker rod to raise or lower said sleeve when said rocker arm is rocked, and a rod one end of which is telescoped within said sleeve and having engagement at its other end with said pivotally mounted journal, locking means to normally hold said rocker rod in a fixed position, and releasing means to permit the rocking of said rocker arm.

6. In a freight car having the usual brake rigging and floating truck, a control bar extending transversely across the car, levers attached to each end of said bar to actuate a power take-off mechanism comprising a drive wheel mounted on an axle of the car, a complementary wheel having frictional engagement with said drive wheel, a winding wheel, a brake chain, one end of said chain being wound around and extending from the lower edge of said winding wheel, a shaft upon which said winding wheel is mounted, said shaft being journaled at one end to the framework of the car and at its other end to a pivotal connection with the truck of said car, and means actuated by said control bar to move said complementary wheel into and out of frictional engagement with said drive wheel.

GEORGE C. BELTMAN.